United States Patent [19]
Coltrin

[11] 3,827,131
[45] Aug. 6, 1974

[54] METHOD OF SWAGE NAIL FASTENING

[76] Inventor: Robert Peyton Coltrin, 678 Skyview Dr., El Cajon, Calif. 92020

[22] Filed: Feb. 5, 1973

[21] Appl. No.: 329,641

[52] U.S. Cl............ 29/432.1, 29/509, 29/526, 85/21, 85/44, 52/758 F, 227/144
[51] Int. Cl......................................... B23p 11/00
[58] Field of Search......... 29/432.1, 432, 526, 520, 29/509, 510, 511; 151/41.7; 52/758 F; 85/44, 21; 227/20, 144

[56] References Cited
UNITED STATES PATENTS

| | | | |
|---|---|---|---|
| 1,600,665 | 9/1926 | Cocks | 85/44 UX |
| 1,912,222 | 5/1933 | Rosenberg | 85/21 |
| 2,015,159 | 9/1935 | Rosenberg | 85/44 |
| 3,117,611 | 1/1964 | Matthews | 29/520 X |
| 3,300,850 | 1/1967 | Stevernagel | 29/432.1 |
| 3,460,234 | 8/1969 | Damtorno | 29/432.1 |
| 3,507,315 | 4/1970 | Tummarello | 151/41.7 |

*Primary Examiner*—Charlie T. Moon
*Attorney, Agent, or Firm*—Brown and Martin

[57] ABSTRACT

A fastening system including a tool adapted for use in conjunction with a specialized fastener together with the method for fastening operations. The specialized fastener has a threaded shank portion with a piercing tip. The shank is connected to an enlarged head portion which is in the form of a cylindrical slotted head. The sides of the cylinder are utilized in aligning the fastener in the clamping tool. A circumferential groove is provided to cooperate with an O-ring retention device. The fastener is received in the head portion of a clamping device and retained by an O-ring to align and retain the shank portion with the bore of an anvil. The anvil is positioned on the opposite side of the sheet material to which the fastener is applied. Pressure from the clamp forces the piercing tip through the sheet material and a portion of the sheet material is swaged into the threaded portion of the fastener by the anvil. The threads may be utilized to withdraw the fastener by the use of a screwdriver with the slotted head.

2 Claims, 5 Drawing Figures

PATENTED AUG 6 1974  3,827,131

METHOD OF SWAGE NAIL FASTENING

BACKGROUND OF THE INVENTION

There exists a number of applications in construction and similar operations where it is desired to have a high speed, high strength, method of securing articles to sheet stock. For example, in the construction industry, increased use is being made of studs for interior building walls. These studs are made of a light gauge sheet metal and are bent to the outer dimensions of a conventional two-by-four stud. It is necessary to attach various articles to these studs in the finishing of the building structure. One of the most frequent requirements is for the securing of electrical junction boxes and similar electrical hardware. In conventional installation techniques, it is necessary to predrill a hole in the sheet metal material and then utilize fastener in conjunction with a speed nut or other nut. Such an operation requires considerable installation time and may be difficult to perform in crowded positions. An additional deficiency of this prior art technique is that it may be necessary to utilize a washer to provide sufficient bearing surface to securely hold the electrical junction box or other part.

It is therefore desirable to have a fastening system that is adaptable to rapid operation and the elimination of high labor time fastening systems, especially if such a fastening system does not require the use of a washer to provide a sufficient bearing surface.

SUMMARY OF THE INVENTION

An exemplary embodiment of the invention utilizes a unique swage nail fastener in conjunction with specially adapted clamping tool to apply and securely hold an article such as an electrical junction box to sheet materials, such as a sheet metal stud, in a single operation. The fastener of the invention comprises a shank portion which may advantageously be threaded or have an otherwise raised surface, for purposes which will become more apparent hereinafter. The shank portion terminates at a first end in a piercing tip, and at the opposed end, is secured to an enlarged head portion. The head is enlarged in the diametric direction so that the head may serve in the manner of a washer to provide sufficient bearing surface that the junction box, for example, will be securely held without resort to auxiliary devices. The head is also enlarged in the axial direction to provide a cylindrical bearing surface that is utilized in conjunction with retention means on the clamping tool to accurately align the shank of the fastener and position it for insertion into an anvil portion of the clamp. The entire shank and head portion of the fastener are normally made of the same material, which must be of a material having a hardness considerably in excess of the hardness of the sheet material with which the fastener is to be employed.

The clamping tool provides for the application of compressive force to force together a head portion and anvil portion. The distance between the head and anvil portion is adjustable. The head portion comprises a cylindrical bore sized to accept the enlarged head of the fastener. The cylindrical bore carries an O-ring that has an inner diameter slightly smaller than the outer diameter of the enlarged head so that it frictionally engages a circumferential groove in the enlarged head and retains the fastener within the head portion of the clamping tool in axial alignment with the bore in the anvil means with the tool in its closed or compressing position.

The method of the invention involves the installation of a fastener into the head of a clamping tool and the insertion of the shank portion of the fastener through a hole or other fastening portion of the article to be fastened. With the fastener and article in position, the tool is located over the sheet material with the fastener on one side of the sheet material and the anvil portion of the tool on the opposite side thereof. The tool is operated to apply compressive force which causes the piercing point on the shank of the fastener to penetrate the sheet material. This forcible penetration bends a portion of the sheet material away from the hole being created in the surface of the sheet material. The excess sheet material is formed by the bore in the anvil means and forced by the anvil into intimate engagement with the surface of the shank. The shank threads or other roughened surface deforms the material and therefore creates a locking engagement between the sheet material and the fastener.

The threaded configuration for the shank is preferred since it allows the removal of the fastener with a screwdriver, however it is with the scope of the invention to provide an undercut shank to receive and cooperate with the excess sheet material and hold the fastener in position.

It is therefore an object of the invention to provide a new and improved swage nail fastening system.

It is another object of the invention to provide a new and improved swage nail fastening system which provides for a reduction in the installation time of articles on sheet material.

It is another object of the invention to provide a new and improved swage nail fastening system with a unique fastener design.

It is another object of the invention to provide a new and improved swage nail fastening system which is adaptable to a variety of fastening uses.

It is another object of the invention to provide a new and improved swage nail fastening system that includes a unique clamping tool to facilitate installation of fasteners.

It is another object of the invention to provide a new and improved swage nail fastening system that incorporates a unique fastening method.

It is another object of the invention to provide a new and improved swage nail fastening system which completes the fastening operation with a single motion.

It is another object of the invention to provide a new and improved swage nail fastening system wherein the fastener may be subsequently removed as desired.

It is another object of the invention to provide a new and improved swage nail fastening system with provision for automatic alignment of the fastener and clamping tool.

It is another object of the invention to provide a new and improved swage nail fastening system which is relatively low in cost.

It is another object of the invention to provide a new and improved swage nail fastening system that eliminates the necessity for washers utilized to produce the required bearing surface.

Other objects and many attendant advantages of the invention will become more apparent upon a reading of the following detailed description together with the drawings in which like referenced numerals refer to like parts throughout and in which.

Figure 1:
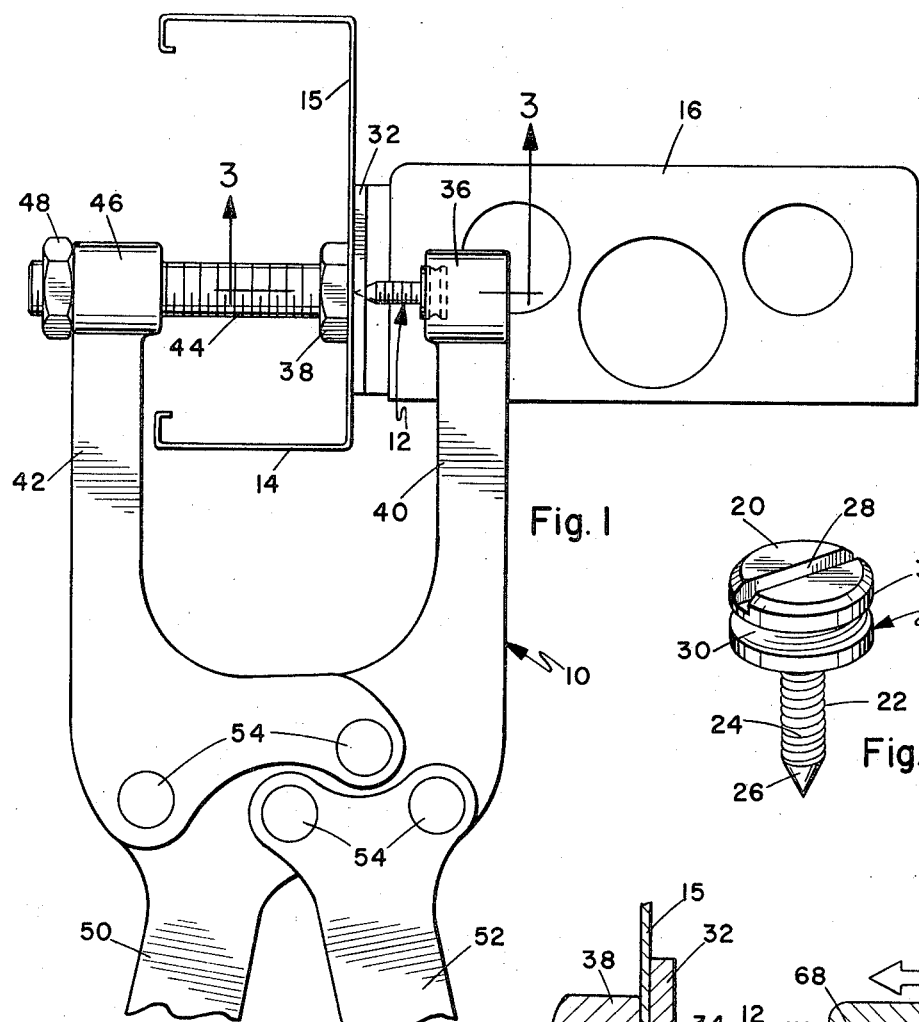
FIG. 1 is a top plan view illustrating the initial application of a fastener to secure an outlet box to a metal stud.

Referring now to the drawings, there is illustrated in FIG. 1 a clamping tool 10 carrying a fastener 12 and in position for securing a junction box 16 to a metal stud 14.

Figure 2:
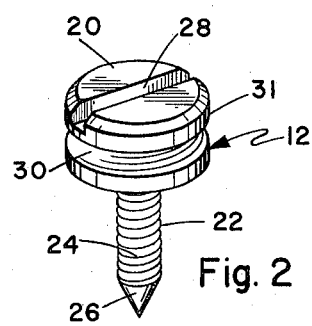
FIG. 2 is a perspective view of the fastener.

Detailed configuration of the fastener is illustrated in FIG. 2. The fastener 12 includes a head portion 20 and shank portion 22. The shank portion 22 in the preferred embodiment is provided with a plurality of turns of buttress type threads 24. The shank terminates in a piercing tip 26.

The head portion is substantially enlarged with respect to the shank and it has been found to be advantageous to provide a head portion which is at least three times the diameter of the shank. Further, the head portion has a considerable axial extent, it being found to be advantageous to provide a head portion having an axial extent at least one third of the total length of the shank. The head portion is in a substantially cylindrical configuration and the cylindrical outer surface 31 is provided with a circumferential groove 30. This groove cooperates with an O-ring retention device to be described more fully hereinafter. A slot 28 in the outer surface of the head is provided to facilitate the removal of the fastener after installation, should that become desirable. The entire fastener in the preferred embodiment is made of hardened tool steel so that it may be used with sheet material having a wide range of hardness.

The overall configuration of the clamping tool adapted for use with the fastener of the invention is illustrated in FIG. 1. Clamping tool 10 includes clamp arms 40 and 42 which are pivoted on dual pivots 54 to handle portions 50 and 52. The action of the handles and pivots is such that the application of force tending to cause the ends of the handles to be forced together causes the arms 40 and 42 to be forced together. The arm 42 has a threaded head end 46 which receives threaded shaft 44 of anvil portion 38. The position of the anvil portion 38 is adjustable by threading the shaft 44 in and out of the threaded head 46. An adjusted position is retained through the use of a lock nut 48. Clamp arm 40 supports retaining head 36 for holding and retaining the fastener 12.

Figure 3:
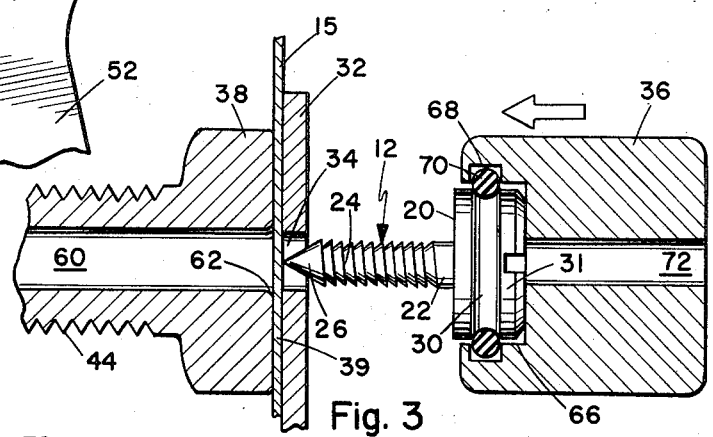
FIG. 3 is an enlarged sectional view taken on line 3—3 of FIG. 1.
Figure 4:
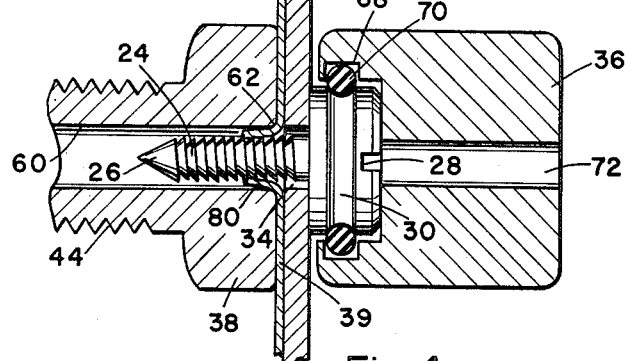
FIG. 4 is a similar sectional view with the fastener fully secured.
Figure 5:
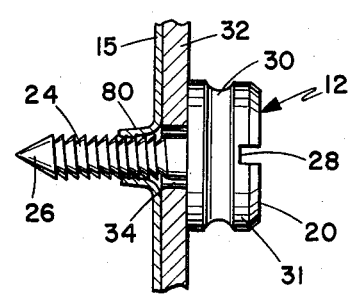
FIG. 5 is a sectional view of a fully seated fastener with the clamping tool removed.

A detailed configuration of the anvil and retention head are illustrated in FIG. 3. The anvil 38 includes a flat anvil bearing surface 39 intended to cooperate with flat sheet material 15. An axial bore 60 is sized to receive the shank of the fastener together with the separated and the bent portions of the sheet material 15. A bend radius 62 provides a transition between the bearing surface and bore 60 to bend the sheet material through an angle of substantially 90°. The head 36 includes a cylindrical bore 66 having a retention groove 68, sized to receive an O-ring 70. The O-ring 70 is made of rubber or other resilient material so that the fastener 12 may be forced to expand the O-ring and cause the O-ring to resiliently position itself within the groove 30 on the cylindrical alignment surface 31 of fastener 12. Access to the upper surface of the fastener is provided by an access bore 72 so that if it is desired, a fastener may be driven from the tool. USE The practice of the method of the invention will be described in conjunction with the installation of a junction box 16. Junction box 16 is illustrated as including a mounting flange 32 which is provided with a fastening opening 34. A fastener 12 is inserted within the head portion of the clamping tool and retained therein by the resilient action of the O-ring 70. The O-ring 70 functions to align the shank portion 22 of the fastener with the ultimate position for the bore 60 in anvil 38. The outlet box 16 is placed in its desired final position and the piercing point 26 of shank 24 placed in the position illustrated in FIG. 1 and 3. The clamping tool is operated to bring the bearing surface 39 of anvil 38 into engagement with the opposed face of the sheet material 15. Further pressure is applied to the handle portions 50 and 52 of the clamping tool to cause the piercing point 26 of fastener 12 to penetrate the sheet material 15 and cause the piercing point 26 and shank 22 of the fastener 12 to enter the axial bore 60 of the anvil 38. In the process of piercing the sheet material 15, a portion 80 of the sheet material will be bent around the bend radius 62 on anvil 38 and pressed between the threads 24 on shank 22 and the surface of bore 60. The pressure on the tool causes this action to take place with considerable force causing deformation of the sheet material into the recesses in the threaded shank portion. In the preferred embodiment, a buttress type thread is employed for the shank which thread has the configuration illustrated in FIG. 4, whereby the fastener would resist movement toward the right in that figure but would be relatively easily moved in the clamping direction. After this operation the tool can be removed, leaving the fastener in the position illustrated in FIG. 5, securely retaining the junction box through the relatively large bearing surface provided by the enlarged head 20, and the clamped fastening or swage fastening action between the sheet metal portions 80 and threaded shank 22.

Having described my invention, I now claim:

1. A method of securing articles to sheet material comprising:

positioning an anvil with an opening sized to accept the threaded shank of a fastener having a head on one end and a pointed piercing tip on the other end against said sheet material on one side thereof, inserting the shank of a fastener through the article to be secured, axially forcing said piercing tip on said fastener through the other side of said sheet material creating an opening in said sheet material and bending said sheet material away from said opening to produce an opening having a diameter sufficiently large to accept the shank of said fastener, pressing the head of said fastener into contact with one surface of said sheet material and causing a portion of said bent sheet material to be pressed by said anvil in contact with the threads of said shank of said fastener.

2. The method of claim 1 wherein the step of inserting the shank of said fastener is preceded by:

securing said fastener within the head of a clamping tool, and said anvil being positioned in axial alignment with said shank of said fastener.

* * * * *